(12) United States Patent
Chen et al.

(10) Patent No.: US 11,690,122 B2
(45) Date of Patent: Jun. 27, 2023

(54) CONNECTION RE-ESTABLISHMENT METHOD AND RELATED DEVICE

(71) Applicant: VIVO MOBILE COMMUNICATION CO., LTD., Chang'an Dongguan (CN)

(72) Inventors: Li Chen, Chang'an Dongguan (CN); Yumin Wu, Chang'an Dongguan (CN); Jing Liang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/038,929

(22) Filed: Sep. 30, 2020

(65) Prior Publication Data

US 2021/0014922 A1 Jan. 14, 2021

Related U.S. Application Data

(63) Continuation of application No. PCT/CN2019/081235, filed on Apr. 3, 2019.

(30) Foreign Application Priority Data

Apr. 4, 2018 (CN) .......................... 201810302209.1

(51) Int. Cl.
  *H04W 4/00* (2018.01)
  *H04W 76/19* (2018.01)
  *H04W 36/08* (2009.01)
(52) U.S. Cl.
  CPC ........... *H04W 76/19* (2018.02); *H04W 36/08* (2013.01)
(58) Field of Classification Search
  CPC ..... H04W 76/19; H04W 36/08; H04W 36/34; H04W 74/08; H04W 36/26; H04W 74/0833; H04W 76/18

USPC .......................................... 455/436; 370/331
See application file for complete search history.

(56) References Cited

U.S. PATENT DOCUMENTS

| | | | |
|---|---|---|---|
| 2011/0086640 A1 | 4/2011 | Iwamura et al. | |
| 2011/0096671 A1 | 4/2011 | Lindstrom et al. | |
| 2017/0094565 A1* | 3/2017 | Sharma | ............... H04L 65/1016 |
| 2018/0049261 A1* | 2/2018 | Tenny | .................. H04W 76/15 |
| 2020/0045602 A1 | 2/2020 | Jiang | |

FOREIGN PATENT DOCUMENTS

| | | |
|---|---|---|
| CN | 101500279 A | 8/2009 |
| CN | 101668320 A | 3/2010 |
| CN | 101686577 A | 3/2010 |
| CN | 101754414 A | 6/2010 |
| CN | 101873655 A | 10/2010 |

(Continued)

OTHER PUBLICATIONS

Extended European Search Report related to Application No. 19781895.8; dated Apr. 25, 2021.

(Continued)

*Primary Examiner* — Marcos Batista
(74) *Attorney, Agent, or Firm* — von Briesen & Roper, s.c.

(57) ABSTRACT

The present disclosure provides a connection re-establishment method and related device, the method including: performing a handover process; and initiating a connection re-establishment on the first node if a re-establishment trigger condition is satisfied by a terminal, wherein the first node includes at least one of a source node or a target node in the handover process.

18 Claims, 5 Drawing Sheets

(56) References Cited

FOREIGN PATENT DOCUMENTS

| CN | 101998475 A | 3/2011 |
|---|---|---|
| CN | 102123462 A | 7/2011 |
| CN | 102769849 A | 11/2012 |
| CN | 103379663 A | 10/2013 |
| CN | 103841608 A | 6/2014 |
| CN | 107113673 A | 8/2017 |
| EP | 2283690 A1 | 2/2011 |
| EP | 2387270 A1 | 11/2011 |
| EP | 2283690 B1 | 7/2015 |
| EP | 3611963 A1 | 2/2020 |
| RU | 2461990 C2 | 9/2012 |
| WO | 2009148378 A1 | 12/2009 |
| WO | 2013046282 A1 | 4/2013 |

OTHER PUBLICATIONS

Russian Office Action for related Application No. 2020136070/07(066507); dated Mar. 16, 2021.
Russian Search Report for related Application No. 2020136070/07(066507); dated Apr. 3, 2021.
Motorola, "Remaining isssues related to Handover Failure handling", Mar. 31-Apr. 4, 3GPP TSG-RAN WG2 #61bis, Shenzhen, China.
Nokia Siemens Networks Nokia Corporation, "Re-establishment Enhancements for HeNet", Apr. 15-19, 2013 TSG-RAN WG2 Meeting #81bis, Chicago.
TCL Communication Ltd., ASTRI, "Discussion on Conditional Handover in NR", Feb. 26-Mar. 2, 2018 3GPP TSG-RAN WG2 Meeting #101, Athens, Greece.
Nokia, Nokia Shanghai Bell, "Configuration Management for Conditional Handover", Feb. 26-Mar. 2, 2018, 3GPP TSG-RAN WG2 Meeting #101, Athens, Greece.
International Search Report & Written Opinion related to Application No. PCT/CN2019/081235; dated Oct. 15, 2020.
Chinese Office Action for related Chinese Application No. 201810302209.1; dated May 8, 2020.
Qualcomm Europe, "Access Stratum based solution to connection recovery after RLF", May 4-8, 2009, 3GPP TSG RAN WG2 #66, San Francisco, USA.
ASTRI, TCL Communication Ltd., "Discussion on Conditional Handover in NR", Jan. 22-26, 2018, 3GPP TSG-RAN WG2 NR Ad hoc 1801, Vancouver, Canada.
Ericsson, "Enhancing Handover Failure", Feb. 26-Mar. 2, 2018 3GPP TSG-RAN WG2 #101, Athens, Greece.
European Communication pursuant to Article 94(3) for related Application No. 19781895.8; dated Apr. 19, 2023.
3rd Generation Partnership Project, Technical Specification Group Radio Access Network; Evolved Universal Terrestrial Radio Access (E-UTRA) Radio Resource Control (RRC); Protocol Specification, Release 8, 3GPP TS 36.331 V8.0.0 (Dec. 2007).

\* cited by examiner

CONNECTION RE-ESTABLISHMENT METHOD AND RELATED DEVICE

CROSS-REFERENCE TO RELATED APPLICATION

This patent application is a bypass continuation under 35 U.S.C. § 111 of PCT/CN2019/081235 filed on Apr. 3, 2019, which claims priority to Chinese Patent Application No. 201810302209.1 filed on Apr. 4, 2018, both of which are incorporated herein by reference in their entireties.

TECHNICAL FIELD

The present disclosure relates to the field of communication technology, and in particular to a connection re-establishment method and related device.

BACKGROUND

In the case of conditional handover (Conditional Handover), a terminal may determine whether the handover trigger condition configured by a source node is satisfied according to its own measurement results, so as to determine whether to initiate handover or request handover from the network. As the terminal may move to a location where the source node channel condition is poor, if the terminal handover fails, communication interruption of the terminal may be caused.

SUMMARY

The embodiment of the present disclosure provides a connection re-establishment method and related device.

In a first aspect, an embodiment of the present disclosure provides a connection re-establishment method, the method including:
  performing a handover process;
  if a terminal satisfies the re-establishment trigger condition, initiating a connection re-establishment on the first node,
  wherein, the first node includes at least one of a source node or a target node in the handover process.

In a second aspect, an embodiment of the present disclosure provides a connection re-establishment method, the method including:
  receiving re-establishment information sent by the target node, wherein the re-establishment information includes at least one of a re-establishment condition or a re-establishment configuration;
  sending the re-establishment information to the terminal.

In a third aspect, an embodiment of the present disclosure provides a connection re-establishment method, the method including:
  sending re-establishment information to the source node or terminal, wherein the re-establishment information includes at least one of the re-establishment condition or the re-establishment configuration.

In a fourth aspect, an embodiment of the present disclosure provides a terminal, including:
  a handover module for performing the handover process;
  a re-establishment module for initiating connection re-establishment on the first node if the terminal satisfies the re-establishment trigger condition;
  wherein, the first node includes at least one of the source node or the target node in the handover process.

In a fifth aspect, an embodiment of the present disclosure provides a source node, including:
  a receiving module for receiving the re-establishment information sent by the target node, wherein the re-establishment information includes at least one of the re-establishment condition or the re-establishment configuration;
  a first sending module for sending the re-establishment information to the terminal.

In a sixth aspect, an embodiment of the present disclosure provides a target node, including:
  a sending module for sending the re-establishment information to the source node or the terminal, wherein the re-establishment information includes at least one of the re-establishment condition or the re-establishment configuration.

In a seventh aspect, an embodiment of the present disclosure provides a terminal, including a processor, a storage, and a computer program stored on the storage and capable of running on the processor, the computer program implementing, when executed by the processor, the steps of the connection re-establishment method provided by the first aspect of the present disclosure.

In an eighth aspect, an embodiment of the present disclosure provides a source node, including a processor, a storage, and a computer program stored on the storage and capable of running on the processor, the computer program implementing, when executed by the processor, the steps of the connection re-establishment method provided by the second aspect of the present disclosure.

In a ninth aspect, an embodiment of the present disclosure provides a target node, including a processor, a storage, and a computer program stored on the storage and capable of running on the processor, the computer program implementing, when executed by the processor, the steps of the connection re-establishment method provided by the third aspect of the present disclosure.

In a tenth aspect, an embodiment of the present disclosure provides a computer readable storage medium having a computer program stored thereon, the computer program implementing, when executed by a processor, the steps of the above connection re-establishment method.

According to the embodiments of the present disclosure, after the terminal performs the handover process, if the terminal satisfies the re-establishment trigger condition, the connection re-establishment is initiated on at least one of the source node or the target node in the handover process, thereby reducing the communication interruption caused by terminal handover failure.

BRIEF DESCRIPTION OF THE DRAWINGS

In order to explain the technical solutions of the embodiments of the present disclosure more clearly, the accompanying drawings used in the description of the embodiments of the present disclosure will be described briefly below. Obviously, the drawings in the following description are only some embodiments of the present disclosure. For those of ordinary skill in the art, other drawings may be obtained based on these drawings without creative labor.

DETAILED DESCRIPTION

Hereinafter, the technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts should fall within the protection scope of the present disclosure.

The terms "first", "second" and the like in the specification and claims of the present application are used to distinguish similar objects, and are not necessarily used to describe a specific sequence or priority. It should be understood that the numbers used here can be interchanged where appropriate, so that the embodiments of the present application described herein, for example, can be implemented in a sequence other than those illustrated or described herein. In addition, the terms "comprising and "having" and any variations thereof are intended to cover non-exclusive inclusions. For example, processes, methods, systems, products or devices that include a series of steps or units are not necessarily limited to those clearly listed steps or units, but may include other steps or units that are not clearly listed or are inherent to these processes, methods, products, or devices. In addition, the use of "and/or" in the specification and claims means at least one of the connected objects, for example, A and/or B and/or C, which means seven situations: A is included alone, B is included alone, C is included alone, both A and B are included, both B and C are included, both A and C are included, and all of A, B and C are included.

For the convenience of description, some concepts involved in the embodiments of the present disclosure are described below:

Conditional Handover:

In the embodiments of the present disclosure, the conditional handover process may include the following steps:

Step S1, sending, by the source node, a handover request (HO Request) to one or more target nodes.

Figure 1:
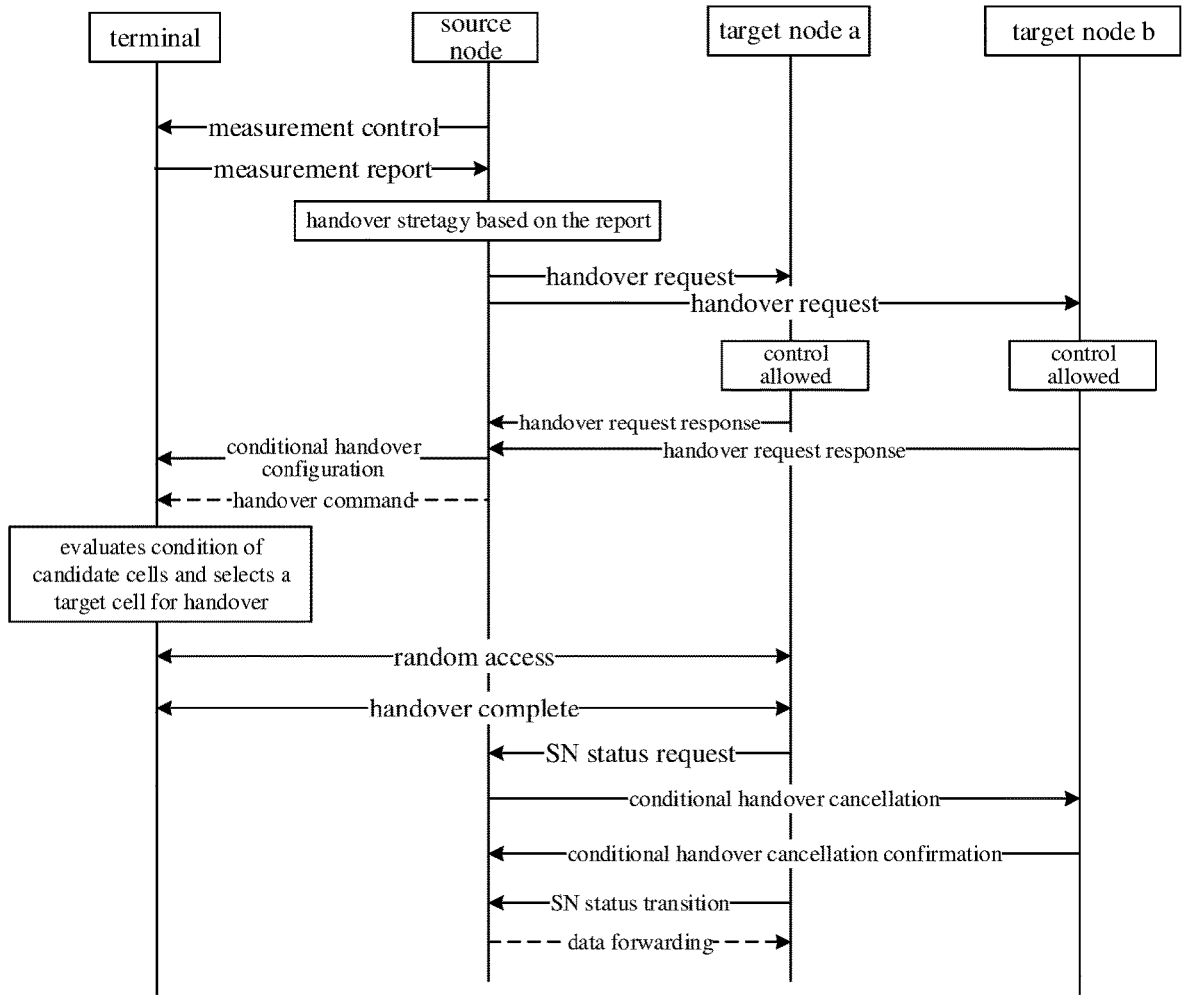
FIG. 1 is a flowchart of the conditional handover according to an embodiment of the present disclosure.

For example, as illustrated in FIG. 1, the source node sends a handover request to the target node a and the target node b.

Step S2, the target node feedback a handover acknowledgement information, that is, a handover request response (HO Request ACK) to the source node.

As shown in FIG. 1, the target node a and the target node b respectively send a handover request response to the source node.

Step S3, sending, by the source node, a conditional handover configuration (Conditional HO Configuration) to the terminal.

In this step, the source node sends configuration information of the conditional handover to the terminal, with configuration information reservation (i.e. Resource Reservation)).

Step S4, the terminal evaluates the condition of the candidate cells and selects a target cell for handover.

In this step, the terminal evaluates whether the condition of a candidate cell is satisfied, and select a target cell corresponding to the handover condition which is satisfied by the terminal.

As shown in FIG. 1, the terminal can evaluate whether the conditions of the target node a and the target node b are satisfied, and when the condition of the target node a is satisfied, the terminal can initiate a random access process to the target node a.

Step S5, the terminal initiates a random access process in the selected target cell.

It can be understood that the above random access may include contention free (Contention Free) random access or contention based random access (Contention based Random Access), and so on.

As shown in FIG. 1, the terminal selects the target node a to initiate a random access.

Step S6, the terminal sends handover complete information to the selected target node.

As shown in FIG. 1, the terminal sends handover complete information (i.e. HO Complete)) to the target node a.

Step S7, the source node sends a conditional handover cancellation command to the target nodes that are not selected.

As shown in FIG. 1, the source node sends a conditional handover cancellation command (Conditional HO Cancellation)) to the target node b.

Step S8, the unselected target nodes send a conditional handover cancellation confirmation command to the source node.

As shown in FIG. 1, the source node sends a conditional handover cancellation confirmation command (Conditional HO Cancellation Confirmation) to the target node b.

Dual Connectivity:

In the fifth generation (5th-Generation, 5G) system, the terminal adopts a dual connectivity (Dual Connectivity, DC) architecture including two cell groups, i.e. a master cell group (Master Cell Group, MCG) and a secondary cell group (Secondary Cell Group, SCG). MCG corresponds to a master node (Master Node, MN) of the network side, SCG corresponds to a secondary node (Secondary Node, SN) of the network side. MCG includes a primary cell (Primary Cell, PCell) and a secondary cell (Secondary Cell, SCell), SCG includes a primary and secondary cell (Primary Secondary Cell, PSCell) and a SCell. PCell and PSCell can also be referred to as special cell (Special Cell, SpCell).

Figure 2:
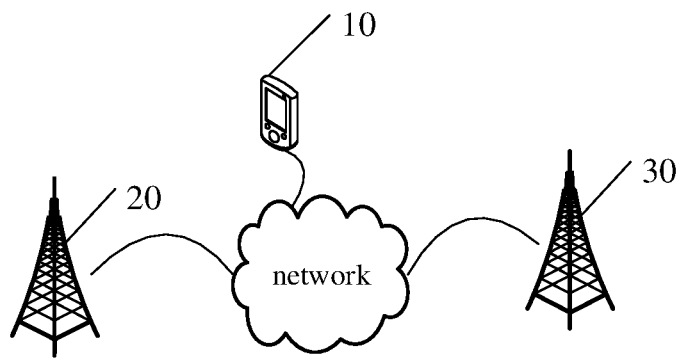
FIG. 2 is a schematic diagram of a network architecture to which the connection re-establishment method is applied according to an embodiment of the present disclosure.

Referring to FIG. 2, FIG. 2 is a schematic diagram of a network architecture to which the embodiments of the present disclosure are applied. As shown in FIG. 2, the network architecture includes a terminal 10, a source node 20 and a target node 30, wherein the terminal 10, the source node 20 and the target node 30 are capable of communicating with each other through the network. The terminal 10 may be a mobile phone, a tablet personal computer (Tablet Personal Computer), a laptop computer (Laptop Computer), a personal digital assistant (personal digital assistant, PDA), or a wearable device (Wearable Device) and the like. The source node 20 and/or the target node 30 may be an evolutionary node B (Evolutional Node B, eNB or eNodeB), or a base station (gNB) in a 5G network, which is not limited herein.

It should be understood that there may be one target node 30 or at least two target nodes 30, FIG. 2 is illustrated with one target node 30 as an example. The above-mentioned terminal 10 is the user equipment (User Equipment, UE).

In the embodiments of the present disclosure, after the terminal 10 enters the handover process, for example, after the source node 20 sends a handover request to the target node 30, or the terminal 10 receives the handover configuration sent by the source node 20, if the terminal 10 satisfies the re-establishment trigger condition, the terminal 10 initiates a connection re-establishment on at least one of the source node 20 or the target node 30, for example, radio resource control (Radio Resource Control, RRC) connection re-establishment.

Optionally, the re-establishment trigger condition may include but not limited to, at least one of timer expires, handover failure (Handover Failure), connection establishment failure, connection re-establishment failure, preset re-establishment conditions, and radio link failure (Radio Link Failure, RLF).

Optionally, before the terminal 10 initiates a connection re-establishment on the target node 30, the target node 30 may send re-establishment information to the terminal 10 or the source node 20, wherein the re-establishment information may include at least one of the re-establishment condition or the re-establishment configuration. It should be noted that in a case where the target node 30 sends re-establishment information to the source node 20, the source node 20 may send to the terminal 10 the re-establishment information which is received from the target node 30.

Optionally, the source node 20 may also send context information (i.e. UE Context) of the terminal 10 to the target node 30 before the terminal 10 initiates a connection re-establishment on the target node 30.

Optionally, the target node 30 may send a terminal context information request to the source node 20, and the source node 20 sends the context information of the terminal 10 to the target node 30 in response to the terminal context information request.

In the embodiment of the present disclosure, after the terminal 10 performs the handover process, if the terminal 10 satisfies the re-establishment trigger condition, the connection re-establishment is initiated on at least one of the source node 20 or the target node 30, so that in the case of handover failure of the terminal 10, the connection re-establishment can be carried out quickly to reduce the communication interruption caused by the terminal handover failure.

Figure 3:
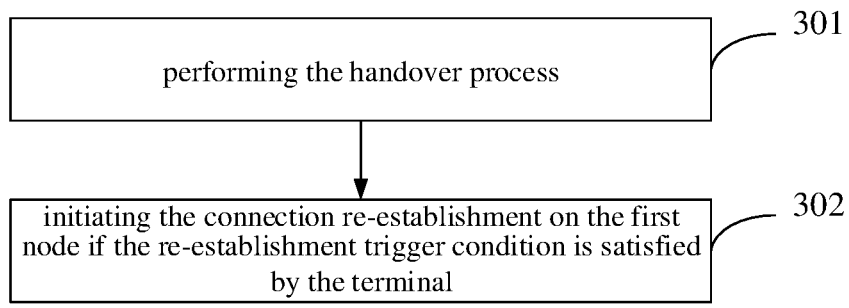
FIG. 3 is a flowchart of the connection re-establishment method according to an embodiment of the present disclosure.

The embodiment of the present disclosure provides a connection re-establishment method, which is applied to a terminal. FIG. 3 is a flowchart of the connection re-establishment method according to an embodiment of the present disclosure, the method including:

Step 301, performing the handover process.

For example, the terminal can evaluate the handover conditions of the respective target nodes after receiving the handover configuration sent by the source node, and can select a target node, the handover condition of which is satisfied by the terminal, to initiate the handover process, for example, initiate random access to the target node.

Step 302, if the re-establishment trigger condition is satisfied by the terminal, the connection re-establishment is initiated on the first node, wherein the first node includes at least one of the source node or the target node in the handover process.

In the embodiment of the present disclosure, the target node of the above handover process may refer to the target node of the terminal handover candidate, such as the target node a and the target node b shown in FIG. 1. The target node of the above handover process may be one or at least two.

Specifically, after the terminal enters the handover process, if the terminal satisfies the re-establishment trigger condition, the connection re-establishment is initiated on at least one of the source node or the target node in the handover process, so that when the terminal handover fails, the connection re-establishment can be carried out quickly to reduce the communication interruption caused by the terminal handover failure.

Optionally, the re-establishment trigger condition may include at least one of the following:

expiration of timer, handover failure, connection establishment failure, connection re-establishment failure, preset re-establishment conditions, and radio link failure RLF. In the embodiment of the present disclosure, the timer may include at least one of a handover timer or a preset timer for triggering connection re-establishment. The above-mentioned connection establishment failure may refer to a failure of connection establishment which is initiated after the handover process is initiated, for example, a failure of RRC connection establishment which is initiated after the handover process is initiated. The above-mentioned preset re-establishment conditions may be predefined in the protocol or configured by the network side, and optionally, the preset re-establishment conditions may include, but are not limited to, at least one of expiration of timer, handover failure, connection establishment failure, connection re-establishment failure, and RLF.

Optionally, the expiration of timer may include at least one of the following:

expiration of handover timer;
expiration of preset timer;
expiration of at least one handover timer;
expiration of at least one preset timer.

In the embodiment of the present disclosure, the expiration of timer may include at least one of expiration of the handover timer or expiration of the preset timer, wherein the handover timer may be one or at least two, and the preset timer may be one or at least two.

Optionally, if there are at least two handover timers, a connection re-establishment can be initiated on the first node when some of the at least two handover timers expire (for example, any one of the at least two handover timers expire), or a connection re-establishment can be initiated on the first node if all of the at least two handover timers expire.

The preset timer may be a timer for triggering connection re-establishment. Optionally, if there are at least two preset timers, a connection re-establishment can be initiated on the first node if some of the at least two preset timers expire (for example, any one of the at least two preset timers expire). Connection re-establishment can also be initiated on the first node if all of the at least two preset timers expire.

In the embodiment of the present disclosure, the expiration of timer may also include at least one of expiration of at least one handover timer or expiration of at least one preset timer. In the case of one handover timer, the expiration of at least one handover timer may include expiration of the one handover timer. In the case of at least two handover timers, the expiration of at least one handover timer may also include expiration of some handover timer(s) of the at least two handover timers (for example, at least one of the two handover timers expire) or expiration of all the handover timers.

Similarly, in the case of one preset timer, the expiration of at least one preset timer may include expiration of the one preset timer. In the case of at least two preset timers, the expiration of at least one preset timer may also include expiration of some preset timer(s) of the at least two preset timers (for example, at least one of the two preset timers expire) or expiration of all the preset timers.

Optionally, the handover failure may include at least one of the following:

failure of handover from the source node to the target node;

failure of handover from the source node to at least one target nodes;

the number of handover attempts reaches a first preset number;

the number of times satisfying the handover condition reaches a second preset number and the handover fails.

In the embodiment of the present disclosure, the source node and the target node are both the source node and the target node in the handover process. The first preset number and the second preset number can be configured according to the actual demand, for example, the first preset number may be 1, 3, etc., the second preset number may be 3, 4, etc.

In the embodiment of the present disclosure, the handover failure may include the failure of handover from the source node to the target node, wherein the target node may be one or at least two. Specifically, in the case of one target node in the handover process, the handover failure may include a failure of handover from the source node to the target node, and in the case of at least two target nodes in the handover process, the handover failure may include a failure of handover from the source node to some of the at least two target nodes (for example, any one of the at least two target nodes), or failures of handover from the source node to all of the at least two target nodes.

In the embodiment of the present disclosure, the handover failure may include the failure of handover from the source node to at least one target node. Specifically, in the case of one target node in the handover process, the handover failure from the source node to at least one target node may include a failure of handover from the source node to the one target node, and in the case of at least two target nodes in the handover process, the handover failure from the source node to at least one target node may include a failure of handover from the source node to some of the at least two target nodes (for example, any one of the at least two target nodes), or failures of handover from the source node to all of the at least two target nodes.

In the embodiment of the present disclosure, the handover failure may also include that the number of handover attempts reaches the first preset number, wherein, the handover attempt may refer to the handover initiated by the terminal from the source node to a target node. It is understandable that when the terminal handover from the source node to the target node succeed, the process can be terminated, the handover attempt is no longer initiated, and the connection re-establishment is no longer initiated. According to the embodiment of the present disclosure, a connection re-establishment can be initiated on the first node if the number of handover attempts reaches the first preset number and the handover still fails.

In the embodiment of the present disclosure, the handover failure may also include that the number of times satisfying the handover condition reaches a second preset number and the handover fails, wherein the handover condition may be a conditional handover condition, and the terminal can initiate random access on the target node corresponding to the handover condition which is satisfied by the terminal. It is understandable that even if it is determined that the terminal satisfies certain handover condition, the terminal may not initiate random access on the target node corresponding to the handover condition. Specifically, a connection re-establishment can be initiated on the first node if the number of handover attempts reaches a second preset number and the handover still fails.

Optionally, the connection re-establishment failure may include at least one of the following:

failure of connection re-establishment initiated on the source node;

failure of connection re-establishment initiated on the target node;

failure of connection re-establishment initiated on at least one target node.

In the embodiment of the present disclosure, the connection re-establishment failure may include the failure of connection re-establishment initiated on the target node, wherein the target node may be one or at least two. Specifically, in the case of one target node in the handover process, the connection re-establishment failure initiated on the target node may include a failure of connection re-establishment initiated on the one target node, and in the case of at least two target nodes in the handover process, the connection re-establishment failure initiated on the target node may include a failure of connection re-establishment initiated on some of the at least two target nodes (for example, any one of the at least two target nodes), or failures of connection re-establishments initiated on all of the at least two target nodes.

In the embodiment of the present disclosure, the connection re-establishment failure may include a failure of connection re-establishment initiated on at least one target node. Specifically, in the case of one target node in the handover process, the connection re-establishment failure initiated on the at least one target node may include a failure of connection re-establishment initiated on the one target node, and in the case of at least two target nodes in the handover process, the connection re-establishment failure initiated on the at least one target node may include a failure of connection re-establishment initiated on some of the at least two target nodes (for example, any one of the at least two target nodes), or failures of connection re-establishments initiated on all of the at least two target nodes.

Optionally, the connection establishment failure may also include at least one of the following:

failure of connection establishment initiated on the source node;

failure of connection establishment initiated on a target node;

failure of connection establishment initiated on at least one target node.

In the embodiment of the present disclosure, the above connection establishment failure may refer to a failure of connection establishment initiated after the handover process is initiated, for example, the connection re-establishment failure may be included.

Optionally, the RLF may include:

RLF that occurs when at least one handover condition is satisfied.

According to the embodiment of the present disclosure, in the case of one handover condition, the RLF that occurs when at least one handover condition is satisfied may include a RLF that occurs when the one handover condition is satisfied. And in the case of at least two handover conditions, the RLF that occurs when at least one handover condition is satisfied may include a RLF that occurs when some of the at least two handover conditions are satisfied (e.g., any one of the two handover conditions) or a RLF that occurs when all of the at least two handover conditions are satisfied.

Optionally, the start time of the handover timer includes at least one of the following:

when or after the terminal determines that the handover condition in the handover command is satisfied;

when or after the terminal determines that at least one handover condition in at least one handover command is satisfied;

when or after the terminal receives the handover command.

In the embodiment of the present disclosure, the above handover command is also referred to as HO CMD. The start time of the handover timer may include the time when the terminal determines that the handover condition in the handover command is satisfied or after the terminal determines that the handover condition in the handover command is satisfied, that is, the handover timer can be started when the terminal determines that the handover condition in the handover command is satisfied, or the handover timer can be started after the terminal determines that the handover condition in the handover command is satisfied. The handover command may be one or more, wherein each handover command may include one or more handover condition.

Specifically, in the case of one handover command, the time when or after the terminal determines that the handover condition in the handover command is satisfied, may include the time when or after the terminal determines that some or all of the handover conditions in the handover command are satisfied; and in the case of at least two handover commands, the time when or after the terminal determines that the handover condition in the handover command is satisfied, may include the time when or after the terminal determines that some or all of the handover conditions in some or all of the handover command in the at least two handover commands are satisfied.

In the embodiment of the present disclosure, the start time of the handover timer may also include a time when the terminal determines that at least one handover condition of the at least one handover command is satisfied or after the terminal determines that at least one handover condition of the at least one handover command is satisfied. That is, the handover timer may be started when the terminal determines that at least one handover condition of the at least one handover command is satisfied, or be started after the terminal determines that at least one handover condition of the at least one handover command is satisfied.

Specifically, in the case of one handover command, the at least one handover command includes one handover command, and in the case of at least two handover commands, the at least one handover command may include some or all of the at least two handover commands. Similarly, the at least one handover condition may include some or all of the handover conditions in one handover command, or some or all of the handover conditions in different handover commands.

In the embodiment of the present disclosure, the start time of the handover timer may also include the time when or after the terminal receives the handover command, that is, the handover timer is started when the terminal receives the handover command, or the handover timer is started after the terminal receives the handover command.

Optionally, the stop time of the handover timer includes at least one of the following:

the time when or after the terminal determines that the handover is successful or failed;

the time when or after the terminal determines that the connection re-establishment is successful or failed.

In the embodiment of the present disclosure, the handover timer can be stopped when the terminal determines that the handover is successful or failed, or after the terminal determines that the handover is successful or failed, or the handover timer can be stopped when the terminal determines that the connection re-establishment is successful or failed, or after the terminal determines that the connection re-establishment is successful or failed.

Optionally, the start time of the preset timer includes at least one of the following:

the time when or after the terminal determines that the conditions in the handover command are satisfied;

the time when or after the terminal determines that at least one handover condition of at least one handover command is satisfied;

the time when or after the terminal receives the handover command;

the time when or after the target node acquires the context information of the terminal;

the time when or after at least one target node acquires the context information of the terminal.

In the embodiment of the present disclosure, the start time of the preset timer may include the time when the terminal determines that the conditions in the handover command are satisfied or after the terminal determines that the conditions in the handover command are satisfied, that is, the preset timer can be started when the terminal determines that the conditions in the handover command are satisfied, or after the terminal determines that the conditions in the handover command are satisfied. The handover command may be one or more, wherein each handover command may include one handover condition or a plurality of handover conditions.

Specifically, in the case of one handover command, the time when or after the terminal determines that the handover conditions in the handover command are satisfied may include the time when or after the terminal determines that some or all of the handover conditions in the handover command are satisfied. In the case of at least two handover commands, the time when or after the terminal determines that the handover conditions in the handover command are satisfied may include the time when or after the terminal determines that some or all of the handover conditions in some or all of the at least two handover commands are satisfied.

In the embodiment of the present disclosure, the start time of the preset timer may also include a time when the terminal determines that at least one handover condition of the at least one handover command is satisfied or after the terminal determines that at least one handover condition of the at least one handover command is satisfied. That is, the preset timer may be started when the terminal determines that at least one handover condition of the at least one handover command is satisfied, or be started after the terminal determines that at least one handover condition of the at least one handover command is satisfied.

Specifically, in the case of one handover command, the at least one handover command includes one handover command, and in the case of at least two handover commands, the at least one handover command may include some or all of the at least two handover commands. Similarly, the at least one handover condition may include some or all of the handover conditions in one handover command, or some or all of the handover conditions in different handover commands.

In the embodiment of the present disclosure, the start time of the preset timer may also include the time when or after the terminal receives the handover command, that is, the preset timer is started when the terminal receives the handover command, or the preset timer is started after the terminal receives the handover command.

In the embodiment of the present disclosure, the start time of the preset timer may also include the time when or after the target node acquires the context information of the terminal, that is, the preset timer can be started when the target node acquires the context information of the terminal, or the preset timer can be started after the target node acquires the context information of the terminal. It is understandable that the target node may be one or at least two, wherein, in the case of at least two target nodes, the time when or after the target node acquires the context information of the terminal may include the time when or after some or all of the at least two target nodes acquire the context information of the terminal.

In the embodiment of the present disclosure, the start time of the preset timer may also include the time when or after at least one target node acquires the context information of the terminal, that is, the preset timer can be started when at least one target node acquires the context information of the terminal, or the preset timer can be started after at least one target node acquires the context information of the terminal. Specifically, in the case of one target node in the handover process, the at least one target node includes one target node, and in the case of at least two target nodes in the handover process, the at least one target node includes some or all of the at least two target nodes.

Optionally, the stop time of the preset timer includes at least one of the following:

the time when or after the terminal determines that the handover is successful or failed;

the time when or after the terminal determines that the connection re-establishment is successful or failed.

In the embodiment of the present disclosure, the preset timer can be stopped when the terminal determines that the handover is successful or failed, or after the terminal determines that the handover is successful or failed, or the preset timer can be stopped when the terminal determines that the connection re-establishment is successful or failed, or after the terminal determines that the connection re-establishment is successful or failed.

Optionally, the number of handover attempts reaches the first preset number, includes:

the number of handover attempts satisfying the handover condition reaches the first preset number.

In the embodiment of the present disclosure, the terminal can initiate a handover attempt on the target node corresponding to the handover condition which is satisfied by the terminal, or initiate the handover attempt on the target node corresponding to the handover condition which is not satisfied by the terminal. Specifically, if the number of handover attempts satisfying the handover condition reaches the first preset number and the handover still fails, it indicates that the probability of successful handover of the current terminal is small, at this time a connection re-establishment (for example, RRC connection re-establishment) can be initiated on the first node, so as to improve the success rate of connection re-establishment and reduce communication interruption caused by terminal handover failure.

Optionally, the above-mentioned Step 302, i.e. initiating a connection re-establishment on the first node, may include at least one of the following:

initiating a connection re-establishment on the source node;

initiating a connection re-establishment on the target node;

initiating a connection re-establishment on at least one target node;

initiating a connection re-establishment on a node corresponding to the re-establishment condition which is satisfied by the terminal, wherein the node includes at least one of the source node or target node in the handover process;

initiating a connection re-establishment on at least one node corresponding to the re-establishment condition which is satisfied by the terminal, wherein the at least one node includes at least one of the source node or the target node in the handover process;

initiating a connection re-establishment on each of at least two target nodes in the handover process successively until the connection re-establishment is successful, or the number of connection re-establishment attempts reaches a third preset number, or the preset timer expires.

In the embodiment of the present disclosure, initiating a connection re-establishment on the first node may include initiating a connection re-establishment on the target node, wherein the target node may be one or at least two. Specifically, in the case of at least two target nodes in the handover process, the connection re-establishment initiated on the target node may include connection re-establishment initiated on some of the at least two target nodes (for example, any one of the at least two target nodes), or connection re-establishments initiated on all of the at least two target nodes.

In the embodiment of the present disclosure, initiating a connection re-establishment on the first node may include initiating a connection re-establishment on at least one target node, wherein in the case of one target node in the handover process, the at least one target node includes one target node, and in the case of at least two target nodes in the handover process, the at least one target node includes some or all of the target nodes in the at least two target node.

In the embodiment of the present disclosure, initiating a connection re-establishment on the first node may include initiating a connection re-establishment on a node corresponding to the re-establishment condition which is satisfied by the terminal. Specifically, a connection re-establishment can be initiated on some or all of the nodes corresponding to the re-establishment condition which is satisfied by the terminal.

In the embodiment of the present disclosure, initiating a connection re-establishment on the first node may include initiating a connection re-establishment on at least one node corresponding to the re-establishment condition which is satisfied by the terminal. Specifically, in the case of one node corresponding to the re-establishment condition which is satisfied by the terminal, the connection re-establishment is initiated on the node, and in the case of at least two nodes corresponding to the re-establishment condition which is satisfied by the terminal, the connection re-establishment is initiated on some or all of the at least two nodes.

In the embodiment of the present disclosure, in the case of at least two target nodes in the handover process, initiating a connection re-establishment on the first node may include initiating a connection re-establishment on each of at least two target nodes successively until the connection re-establishment is successful, or the number of connection re-establishment attempts reaches a third preset number, or the preset timer expires. The third preset number can be set depending upon practical demand.

In practical application, a connection re-establishment can be initiated on a first target node of at least two target nodes, and if the connection re-establishment fails, a connection re-establishment can be initiated on a second target node of the at least two target nodes, and if the connection re-establishment fails, a connection re-establishment can be still initiated on a third target node of the at least two target nodes. Such process is repeated until the connection re-establishment is successful, or the number of connection re-establishment attempts reaches the third preset number, or the preset timer expires. It can be understood that the first target node, the second target node and the third target node may be different target nodes of the at least two target nodes.

Optionally, initiating the connection re-establishment on at least one target node, includes:

initiating a connection re-establishment on at least one target node corresponding to the handover condition which is satisfied by the terminal.

In the embodiment of the present disclosure, the at least one target node may be nodes corresponding to the handover condition which is satisfied by the terminal. It can be understood that in the case of one node corresponding to the handover condition which is satisfied by the terminal, the at least one target node includes one target node, and in the case of at least two nodes corresponding to the handover condition which is satisfied by the terminal, the at least one target node includes some or all of the at least two nodes corresponding to the handover condition which is satisfied by the terminal.

According to the embodiment of the present disclosure, by initiating connection re-establishment on at least one target node corresponding to the handover condition which is satisfied by the terminal, the success rate of connection re-establishment can be improved.

Optionally, the initiating a connection re-establishment on each of at least two target nodes in the handover process successively until the connection re-establishment is successful, or the number of connection re-establishment attempts reaches a third preset number, or the preset timer expires, includes:

initiating a connection re-establishment on each target node corresponding to the handover condition or connection re-establishment condition which is satisfied by the terminal successively, until the connection re-establishment is successful, or the number of connection re-establishment attempts reaches the third preset number, or the preset timer expires.

According to the embodiment of the present disclosure, by initiating a connection re-establishment on each target node corresponding to the handover condition or connection re-establishment condition which is satisfied by the terminal successively, the success rate of connection re-establishment can be improved.

Optionally, initiating a connection re-establishment on at least one target node corresponding to the handover condition which is satisfied by the terminal, includes:

initiating a connection re-establishment on at least one target node corresponding to the handover condition which is configured in the handover command and satisfied by the terminal.

In the embodiment of the present disclosure, the handover condition is the condition configured in the handover command (HO CMD), and the at least one target node may include some or all of the target nodes corresponding to the handover condition which is configured in the handover command and satisfied by the terminal. Specifically, in the case of one target node corresponding to the handover condition which is configured in the handover command and satisfied by the terminal, the at least one target node includes one target node; and in the case of at least two target nodes corresponding to the handover condition which is configured in the handover command and satisfied by the terminal, the at least one target node includes some or all of the at least two target nodes.

Optionally, the method also includes:

receiving re-establishment information sent by the target node or the source node, wherein the re-establishment information includes at least one of a re-establishment condition or a re-establishment configuration.

In the embodiment of the present disclosure, the terminal may initiate a connection re-establishment based on the re-establishment information sent by the target node or the source node. The re-establishment configuration may include RRC configuration information, RRC reconfiguration information and so on.

Optionally, the receiving the re-establishment information sent by the source node, includes:

receiving the re-establishment information sent by the source node, the re-establishment information is sent by the target node in a container to the source node.

In the embodiment of the present disclosure, the re-establishment information is contained in the container (Container) by the target node, and is further transmitted to the terminal through the source node. Accordingly, the terminal can receive the re-establishment information sent by the source node, the re-establishment information has been sent by the target node in a container to the source node.

Optionally, the receiving the re-establishment information sent by the target node or the source node, includes:

receiving the re-establishment information sent by the target node or the source node through a handover command or a mobility control command.

In the embodiment of the present disclosure, the terminal may receive the re-establishment information sent by the target node or the source node through a handover command (HO CMD) or mobility control command (Mobility Control).

It can be understood that the above re-establishment information can also be transmitted through other signaling, which is not limited herein.

Optionally, the above-mentioned Step 302, i.e. initiating a connection re-establishment on the first node, may include at least one of the following:

initiating a connection re-establishment on the first node by using the re-establishment configuration of the source node;

initiating a connection re-establishment on the first node by using the re-establishment configuration of the target node;

initiating a connection re-establishment on the first node by using the re-establishment configuration of the first node;

initiating a connection re-establishment on the first node by using the re-establishment configuration in the handover command;

initiating a connection re-establishment on the first node by using at least one of the re-establishment configuration in at least one of the handover command;

initiating a connection re-establishment on the first node by using the re-establishment configuration of a target node corresponding to the handover condition which is satisfied by the terminal, or by using the re-establishment configuration of at least one target node corresponding to the handover condition which is satisfied by the terminal;

initiating a connection re-establishment on the first node by using the re-establishment configuration of a target node corresponding to the re-establishment condition which is satisfied by the terminal, or by using the re-establishment configuration of at least one target node corresponding to the re-establishment condition which is satisfied by the terminal.

In the embodiment of the present disclosure, the source node is a source node of the handover process, and the target node is a target node of the handover process. It can be understood that, in the case of at least two target nodes in the handover process, the initiating a connection re-establishment on the first node by using the re-establishment configuration of the target node may include initiating a connection re-establishment on the first node by using the re-establishment configuration of some or all of the at least two target nodes (for example, any one of the at least two target nodes).

In the case of initiating a connection re-establishment on the first node by using the re-establishment configuration of the first node, for example, when the terminal initiates a connection re-establishment on the target node a, the connection re-establishment may be initiated on the target node a by using the re-establishment configuration of the target node a; and when the terminal initiates a connection re-establishment on both the target node a and the target node b, a connection re-establishment can be initiated on the target node a by using the re-establishment configuration of the target node a, and a connection re-establishment can be initiated on the target node b by using the re-establishment configuration of the target node b.

In the case of initiating a connection re-establishment on the first node by using the re-establishment configuration in the handover command, the handover command may be one or at least two, and the re-establishment configuration in the handover command may be one or at least two. Specifically, in the case of at least two handover command, the connection re-establishment can be initiated on the first node by using some or all of the re-establishment configurations in some or all of the at least two handover commands.

In the case of initiating a connection re-establishment on the first node by using at least one of the re-establishment configuration in at least one of the handover command, for one handover command, the at least one handover command includes one handover command, and for at least two handover commands, the at least one handover command may include some or all of the at least two handover commands. Similarly, the at least one of the re-establishment configuration may include some or all of the re-establishment configurations in a same handover command, or include some or all of the re-establishment configurations in different handover commands. For example, the connection re-establishment may be initiated on the first node by using one of the re-establishment configurations in the handover command.

In the case of initiating a connection re-establishment on the first node by using the re-establishment configuration of a target node corresponding to the handover condition which is satisfied by the terminal, the target node corresponding to the handover condition which is satisfied by the terminal may be one or at least two. In the case of at least two target nodes corresponding to the handover condition which is satisfied by the terminal, the connection re-establishment can be initiated on the first node by using the re-establishment configuration of some (for example, any one of the at least two target nodes) or all of the at least two target nodes.

In the case of initiating a connection re-establishment on the first node by using the re-establishment configuration of at least one target node corresponding to the handover condition which is satisfied by the terminal, for one target node corresponding to the handover condition which is satisfied by the terminal, the re-establishment configuration of at least one target node is the re-establishment configuration of the one target node, and for at least two target nodes corresponding to the handover condition which is satisfied by the terminal, the re-establishment configuration of at least one target node may include the re-establishment configuration of some or all of the at least two target nodes (for example, any one of the at least two target nodes).

It can be understood that, the handover condition satisfied by the terminal may be one or at least two, each handover condition corresponding to a target node. According to the embodiment of the present disclosure, the connection re-establishment can be initiated by using the re-establishment configuration of a target node corresponding to one of the handover commands which are satisfied by the terminal, wherein the handover condition can be configured in the handover command.

Similarly, in the case of initiating a connection re-establishment on the first node by using the re-establishment configuration of a target node corresponding to the re-establishment condition which is satisfied by the terminal, the target node corresponding to the re-establishment condition which is satisfied by the terminal may be one or at least two. In the case of at least two target nodes corresponding to the re-establishment condition which is satisfied by the terminal, a connection re-establishment can be initiated on the first node by using the re-establishment configuration of some or all of the at least two target nodes (for example, any one of the at least two target nodes).

In the case of initiating a connection re-establishment on the first node by using the re-establishment configuration of at least one target node corresponding to the re-establishment condition which is satisfied by the terminal, for one target node corresponding to the re-establishment condition which is satisfied by the terminal, the re-establishment configuration of at least one target node is the re-establishment configuration of the one target node, and for at least two target nodes corresponding to the handover condition which is satisfied by the terminal, the re-establishment configuration of at least one target node may include the re-establishment configuration of some or all of the at least two target nodes (for example, any one of the at least two target nodes).

It can be understood that above embodiments can be implemented in combination depending upon practical demand.

According to the connection re-establishment method provided in the embodiment of the present disclosure, when the terminal handover fails, the connection re-establishment can be carried out quickly, so as to improve the success rate of connection re-establishment and reduce communication interruption caused by terminal handover failure.

Figure 4:
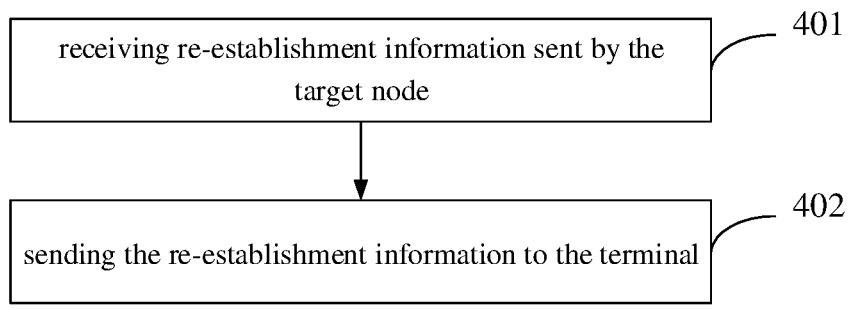
FIG. 4 is a flowchart of the connection re-establishment method according to another embodiment of the present disclosure.

The embodiment of the present disclosure further provides a connection re-establishment method, which is applied to the source node. FIG. 4 is a flowchart of the connection re-establishment method according to another embodiment of the present disclosure, as shown in FIG. 4, the method including:

Step 401, receiving re-establishment information sent by the target node, wherein the re-establishment information includes at least one of a re-establishment condition or a re-establishment configuration.

In the embodiment of the present disclosure, the target node may include some or all of the target nodes in the handover process.

It can be understood that, when the re-establishment information includes the re-establishment condition and the re-establishment configuration, the target node may send the re-establishment condition and the re-establishment configuration to the source node respectively, that is, the re-establishment condition and the re-establishment configuration may be sent in different time; or the re-establishment condition and the re-establishment configuration may be sent to the source node at the same time, that is, the re-establishment condition and the re-establishment configuration may be sent through a same transmission.

Step 402, sending the re-establishment information to the terminal.

In the embodiment of the present disclosure, the source node may send the re-establishment information which is received from the target node to the terminal, such that when the terminal determines that a connection re-establishment needs to be initiated, the connection re-establishment (for example, RRC connection re-establishment) can be initiated based on the received re-establishment information.

According to the embodiment of the present disclosure, by sending the re-establishment information which is received from the target node to the terminal, when the terminal determines that a connection re-establishment needs to be initiated, the connection re-establishment can be initiated based on the received re-establishment information, so as to reduce communication interruption caused by terminal handover failure.

Optionally, in the Step 401, the receiving re-establishment information sent by the target node may include:

receiving the re-establishment information which is sent by the target node and contained in a container.

Accordingly, in the Step 402, the sending the re-establishment information to the terminal may include:

sending the re-establishment information contained in the container to the terminal.

In the embodiment of the present disclosure, the re-establishment information is contained in the container (Container) by the target node and is sent to the source node, such that the source node can send the re-establishment information contained in the container directly to the terminal, preventing the source node from parsing the re-establishment information.

It can be understood that, when the re-establishment information includes the re-establishment condition and the re-establishment configuration, the target node may send the re-establishment condition and the re-establishment configuration in different containers respectively, or send the re-establishment condition and the re-establishment configuration in a same container.

Optionally, in the Step 401, the sending the re-establishment information to the terminal may include:

sending the re-establishment information to the terminal through the handover command or the mobility control command.

In the embodiment of the present disclosure, the handover command is HO CMD, the mobility control command is Mobility Control. It can be understood that the above re-establishment information can also be sent to the terminal through other signaling, which is not limited herein.

Optionally, the method further include:

sending context information of the terminal to the target node.

In the embodiment of the present disclosure, the context information of the terminal is UE Context. Specifically, the source node may send the context information of the terminal to some or all of the target nodes in the handover process, thereby the connection re-establishment can be easily initiated on the target node by the terminal.

Optionally, the sending context information of the terminal to the target node may include:

sending the context information of the terminal to the target node after receiving a terminal context information request sent by the target node.

In the embodiment of the present disclosure, after receiving the terminal context information request sent by the target node, the source node may send the context information of the terminal to the target node in response to the terminal context information request. In this way, the case of sending the context information of the terminal to some target nodes which do not need the context information of the terminal can be avoided, and waste of system resources can be reduced.

Figure 5:
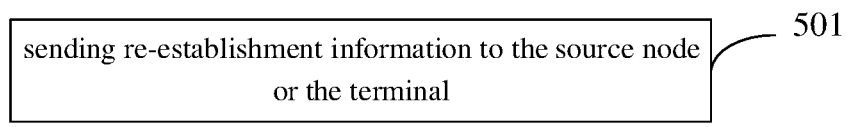
FIG. 5 is a flowchart of the connection re-establishment method according to still another embodiment of the present disclosure.

The embodiment of the present disclosure further provides a connection re-establishment method, which is applied to the target node. FIG. 5 is a flowchart of the connection re-establishment method according to another embodiment of the present disclosure, as shown in FIG. 5, the method including:

Step 501, sending the re-establishment information to the source node or the terminal, wherein the re-establishment information includes at least one of a re-establishment condition or a re-establishment configuration.

It can be understood that, when the re-establishment information includes the re-establishment condition and the re-establishment configuration, the target node may send the re-establishment condition and the re-establishment configuration to the source node or the terminal respectively, that is, the re-establishment condition and the re-establishment configuration may be sent in different time; or the re-establishment condition and the re-establishment configuration may be sent to the source node or the terminal at the same time, that is, the re-establishment condition and the re-establishment configuration may be sent through a same transmission.

It can be understood that, in the case that the target node sends the re-establishment information to the source node, the source node may further send the received re-establishment information to the terminal.

According to the embodiment of the present disclosure, by sending the re-establishment information, when the terminal determines that a connection re-establishment needs to be initiated, the connection re-establishment can be initiated based on the re-establishment information sent by the target node, so as to reduce communication interruption caused by terminal handover failure.

Optionally, in the Step 501, the sending the re-establishment information to the source node may include:

sending the re-establishment information contained in a container to the source node.

In the embodiment of the present disclosure, the re-establishment information is contained in the container (Container) by the target node and sent by the target node to the source node, such that the source node can send the re-establishment information contained in the container directly to the terminal, preventing the source node from parsing the re-establishment information.

Optionally, in the Step 501, the sending the re-establishment information to the terminal may include:

sending the re-establishment configuration to the terminal through the handover command or the mobility control command.

In the embodiment of the present disclosure, the handover command is HO CMD, the mobility control command is Mobility Control. It can be understood that the above re-establishment information can also be sent to the terminal through other signaling, which is not limited herein.

Optionally, the method further include:

receiving context information of the terminal sent by the source node.

In the embodiment of the present disclosure, the context information of the terminal is UE Context. Specifically, the target node may receive the context information of the terminal sent by the source node, thereby the connection re-establishment can be initiated on the target node by the terminal.

Optionally, the receiving context information of the terminal sent by the source node may include:

sending a terminal context information request to the source node; and receiving the context information of the terminal sent by the source node.

In the embodiment of the present disclosure, the target node may firstly send a terminal context information request to the source node, to request the context information of the terminal from the source node, then the target node receives the context information of the terminal sent by the source node in response to the terminal context information request.

Figure 6:
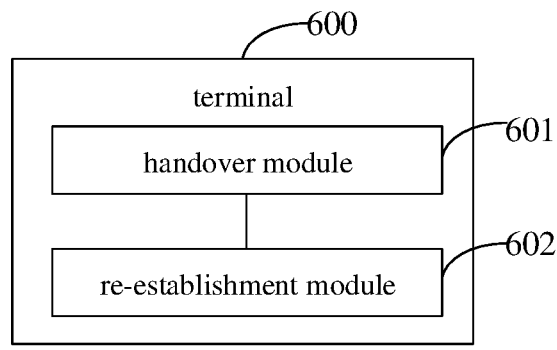
FIG. 6 is a structural diagram of a terminal according to an embodiment of the present disclosure.

FIG. 6 is a structural diagram of the terminal according to an embodiment of the present disclosure. As shown in FIG. 6, the terminal 600 includes a handover module 601 and a re-establishment module 602.

The handover module 601 is configured to perform the handover process. The re-establishment module 602 is configured to initiate the connection re-establishment on the first node if the re-establishment trigger condition is satisfied by the terminal, wherein the first node includes at least one of the source node or the target node in the handover process.

Optionally, the re-establishment trigger condition may include at least one of the following:

expiration of timer, handover failure, connection establishment failure, connection re-establishment failure, preset re-establishment conditions, and radio link failure RLF.

Optionally, the expiration of timer may include at least one of the following:

expiration of handover timer;

expiration of preset timer;

expiration of at least one handover timer;

expiration of at least one preset timer.

Optionally, the handover failure may include at least one of the following:

failure of handover from the source node to the target node;

failure of handover from the source node to at least one target nodes;

the number of handover attempts reaches a first preset number;

the number of times satisfying the handover condition reaches a second preset number and the handover fails.

Optionally, the connection re-establishment failure may include at least one of the following:

failure of connection re-establishment initiated on the source node;

failure of connection re-establishment initiated on the target node;

failure of connection re-establishment initiated on at least one target node.

Optionally, the RLF may include:

RLF that occurs when at least one handover condition is satisfied.

Optionally, the start time of the handover timer includes at least one of the following:

when or after the terminal determines that the handover condition in the handover command is satisfied;

when or after the terminal determines that at least one handover condition in at least one handover command is satisfied;

when or after the terminal receives the handover command.

Optionally, the stop time of the handover timer includes at least one of the following:

the time when or after the terminal determines that the handover is successful or failed;

the time when or after the terminal determines that the connection re-establishment is successful or failed.

Optionally, the start time of the preset timer includes at least one of the following:

the time when or after the terminal determines that the conditions in the handover command are satisfied;

the time when or after the terminal determines that at least one handover condition of at least one handover command is satisfied;

the time when or after the terminal receives the handover command;

the time when or after the target node acquires the context information of the terminal;

the time when or after at least one target node acquires the context information of the terminal.

Optionally, the stop time of the preset timer includes at least one of the following:

the time when or after the terminal determines that the handover is successful or failed;

the time when or after the terminal determines that the connection re-establishment is successful or failed.

Optionally, the number of handover attempts reaches the first preset number, includes:

the number of handover attempts satisfying the handover condition reaches the first preset number.

Optionally, the re-establishment module may include at least one of the following:

a first re-establishment unit, configured for initiating a connection re-establishment on the source node;

a second re-establishment unit, configured for initiating a connection re-establishment on the target node;

a third re-establishment unit, configured for initiating a connection re-establishment on at least one target node;

a fourth re-establishment unit, configured for initiating a connection re-establishment on a node corresponding to the re-establishment condition which is satisfied by the terminal, wherein the node includes at least one of the source node or the target node in the handover process;

a fifth re-establishment unit, configured for initiating a connection re-establishment on at least one node corresponding to the re-establishment condition which is satisfied by the terminal, wherein the at least one node includes at least one of the source node or the target node in the handover process;

a sixth re-establishment unit, configured for initiating a connection re-establishment on each of at least two target nodes in the handover process successively until the connection re-establishment is successful, or the number of connection re-establishment attempts reaches a third preset number, or the preset timer expires.

Optionally, the third re-establishment unit is configured to initiate a connection re-establishment on at least one target node corresponding to the handover condition which is satisfied by the terminal. The sixth re-establishment unit is configured to successively initiate a connection re-establishment on each of the target nodes corresponding to the handover condition or the re-establishment condition which is satisfied by the terminal until the connection re-establishment is successful, or the number of connection re-establishment attempts reaches a third preset number, or the preset timer expires.

Optionally, the third re-establishment unit is configured to initiate a connection re-establishment on at least one target node corresponding to the handover condition which is configured in the handover command and satisfied by the terminal.

Optionally, the terminal further include:

a receiving module, configured for receiving re-establishment information sent by the target node or the source node, wherein the re-establishment information includes at least one of a re-establishment condition or a re-establishment configuration.

Optionally, the receiving module is configured to receive the re-establishment information sent by the source node, the re-establishment information is sent by the target node in a container to the source node.

Optionally, the receiving module is configured to receive the re-establishment information sent by the target node or the source node through a handover command or a mobility control command.

Optionally, the re-establishment module is configured to perform at least one of the following:

initiating a connection re-establishment on the first node by using the re-establishment configuration of the source node;

initiating a connection re-establishment on the first node by using the re-establishment configuration of the target node;

initiating a connection re-establishment on the first node by using the re-establishment configuration of the first node;

initiating a connection re-establishment on the first node by using the re-establishment configuration in the handover command;

initiating a connection re-establishment on the first node by using at least one of the re-establishment configuration in at least one of the handover command;

initiating a connection re-establishment on the first node by using the re-establishment configuration of a target node corresponding to the handover condition which is satisfied by the terminal, or by using the re-establishment configuration of at least one target node corresponding to the handover condition which is satisfied by the terminal;

initiating a connection re-establishment on the first node by using the re-establishment configuration of a target node corresponding to the re-establishment condition which is satisfied by the terminal, or by using the re-establishment configuration of at least one target node corresponding to the re-establishment condition which is satisfied by the terminal.

The process of the method embodiment shown in FIG. 3 can be implemented by the terminal 600 according to the embodiment of the present disclosure, the details of which are not repeated here.

According to the embodiment of the present disclosure, the terminal 600 includes the handover module 601 and the re-establishment module 602. The handover module 601 is configured to perform the handover process, and the re-establishment module 602 is configured to initiate the connection re-establishment on the first node if the re-establishment trigger condition is satisfied by the terminal, wherein the first node includes at least one of the source node or the target node in the handover process. The terminal of the present disclosure is capable of reducing communication interruption caused by terminal handover failure.

Figure 7:
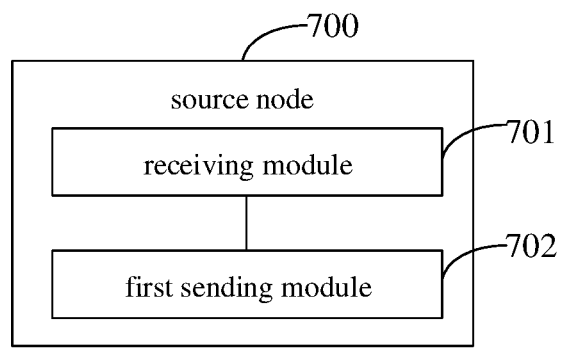
FIG. 7 is a structural diagram of a source node according to an embodiment of the present disclosure.

FIG. 7 is a structural diagram of a source node according to an embodiment of the present disclosure. As shown in FIG. 7, the source node 700 includes a receiving module 701 and a first sending module 702.

The receiving module 701 is configured for receiving re-establishment information sent by the target node, wherein the re-establishment information includes at least one of a re-establishment condition or a re-establishment configuration.

The first sending module 702 is configured for sending the re-establishment information to the terminal.

Optionally, the receiving module is configured to receive the re-establishment information which is sent by the target node and contained in a container. The first sending module is configured to send the re-establishment information contained in the container to the terminal.

Optionally, the first sending module is configured to send the re-establishment information to the terminal through the handover command or the mobility control command.

Optionally, the source node further includes:

a second sending module, configured for sending context information of the terminal to the target node.

Optionally, the second sending module is configured to send the context information of the terminal to the target node after receiving a terminal context information request sent by the target node.

The process of the method embodiment shown in FIG. 4 can be implemented by the source node 700 according to the embodiment of the present disclosure, the details of which are not repeated here.

According to the embodiment of the present disclosure, the source node 700 includes the receiving module 701 and the first sending module 702. The receiving module 701 is configured for receiving re-establishment information sent by the target node, wherein the re-establishment information includes at least one of a re-establishment condition or a re-establishment configuration. The first sending module 702 is configured for sending the re-establishment information to the terminal, thereby the terminal can initiate the connection re-establishment based on the re-establishment information and reduce communication interruption caused by terminal handover failure.

Figure 8:
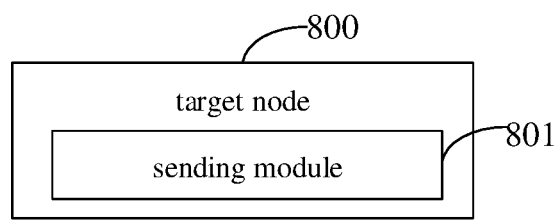
FIG. 8 is a structural diagram of a target node according to an embodiment of the present disclosure.

FIG. 8 is a structural diagram of a target node according to an embodiment of the present disclosure. As shown in FIG. 8, the source node 800 includes a sending module 801.

The sending module 801 is configured for sending the re-establishment information to the source node or the terminal, wherein the re-establishment information includes at least one of a re-establishment condition or a re-establishment configuration.

Optionally, the sending module is configured to send the re-establishment information contained in a container to the source node.

Optionally, the sending module is configured to send the re-establishment configuration to the terminal through the handover command or the mobility control command.

Optionally, the target node further includes:

a receiving module, configured for receiving context information of the terminal sent by the source node.

Optionally, the receiving module is configured to:

send a terminal context information request to the source node; and receive the context information of the terminal sent by the source node.

The process of the method embodiment shown in FIG. 5 can be implemented by the target node 800 according to the embodiment of the present disclosure, the details of which are not repeated here.

According to the embodiment of the present disclosure, the target node 800 includes the sending module 801, the sending module 801 is configured for sending the re-establishment information to the source node or the terminal, wherein the re-establishment information includes at least one of a re-establishment condition or a re-establishment configuration, thereby the terminal can initiate the connection re-establishment based on the re-establishment information and reduce communication interruption caused by terminal handover failure.

Figure 9:
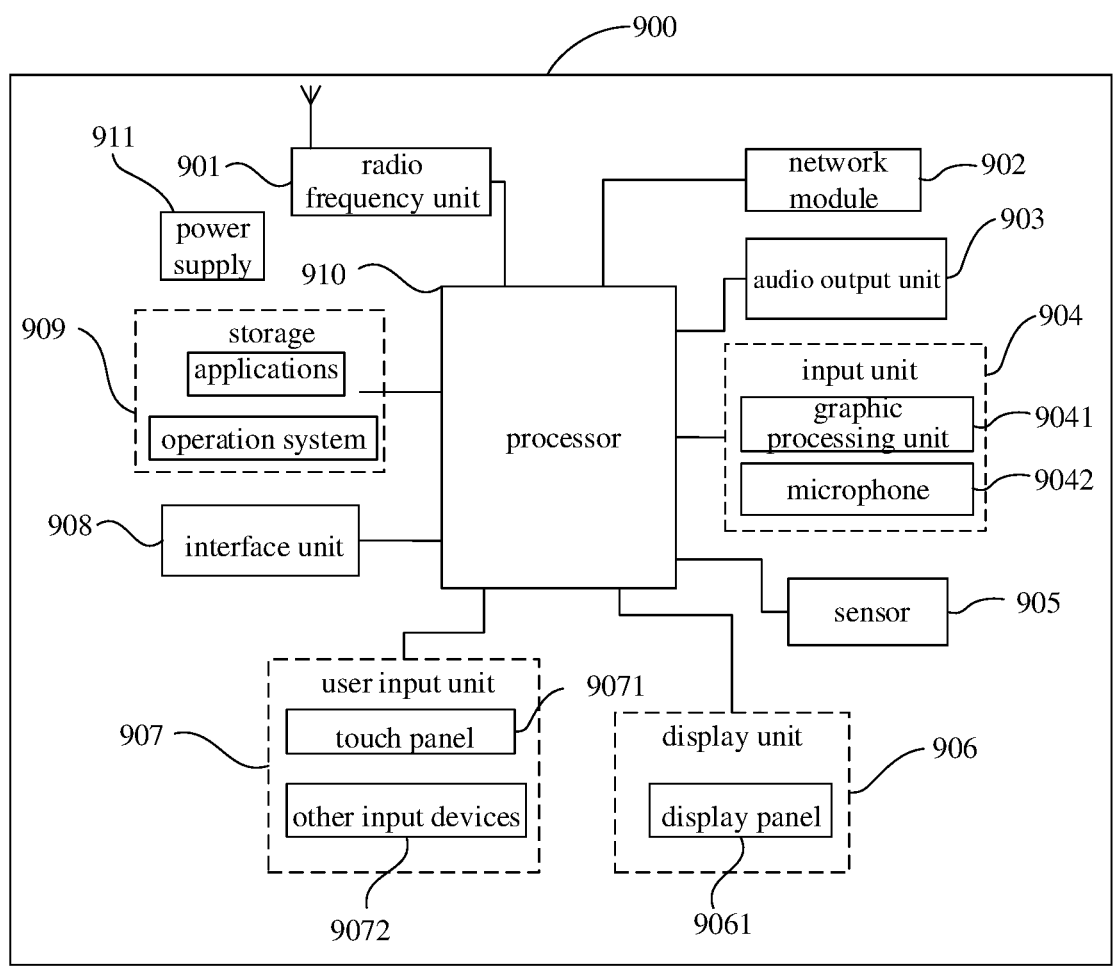
FIG. 9 is a structural diagram of a terminal according to another embodiment of the present disclosure.

FIG. 9 is a structural diagram of a terminal according to another embodiment of the present disclosure. As shown in FIG. 9, the terminal 900 includes, but is not limited to, a RF unit 901, a network module 902, an audio output unit 903, an input unit 904, a sensor 905, a display unit 906, a user input unit 907, an interface unit 908, a memory 909, a processor 910, and a power supply 911. Those skilled in the art will understand that the terminal structure shown in FIG. 9 does not constitute a limit to the terminal, and the terminal may include more or less components than shown, adopt certain components in combination or different component. In the embodiment of the present disclosure, the terminal includes, but is not limited to, a mobile phone, a tablet computer, a notebook computer, a handheld computer, a car terminal, a wearable device, a pedometer and the like.

The processor 910 is configured to perform the handover process, and initiate the connection re-establishment on the first node if the re-establishment trigger condition is satisfied by the terminal, wherein the first node includes at least one of the source node or the target node in the handover process.

In the embodiment of the present disclosure, after the terminal performs the handover process, if the terminal satisfies the re-establishment trigger condition, the connection re-establishment is initiated on at least one of the source node or the target node, so as to reduce the communication interruption caused by the terminal handover failure.

Optionally, the re-establishment trigger condition may include at least one of the following:

expiration of timer, handover failure, connection establishment failure, connection re-establishment failure, preset re-establishment conditions, and radio link failure RLF.

Optionally, the expiration of timer may include at least one of the following:

expiration of handover timer;

expiration of preset timer;

expiration of at least one handover timer;

expiration of at least one preset timer.

Optionally, the handover failure may include at least one of the following:

failure of handover from the source node to the target node;

failure of handover from the source node to at least one target nodes;

the number of handover attempts reaches a first preset number;

the number of times satisfying the handover condition reaches a second preset number and the handover fails.

Optionally, the connection re-establishment failure may include at least one of the following:

failure of connection re-establishment initiated on the source node;

failure of connection re-establishment initiated on the target node;

failure of connection re-establishment initiated on at least one target node.

Optionally, the RLF may include:

RLF that occurs when at least one handover condition is satisfied.

Optionally, the start time of the handover timer includes at least one of the following:

when or after the terminal determines that the handover condition in the handover command is satisfied;

when or after the terminal determines that at least one handover condition in at least one handover command is satisfied;

when or after the terminal receives the handover command.

Optionally, the stop time of the handover timer includes at least one of the following:

the time when or after the terminal determines that the handover is successful or failed;

the time when or after the terminal determines that the connection re-establishment is successful or failed.

Optionally, the start time of the preset timer includes at least one of the following:

the time when or after the terminal determines that the conditions in the handover command are satisfied;

the time when or after the terminal determines that at least one handover condition of at least one handover command is satisfied;

the time when or after the terminal receives the handover command;

the time when or after the target node acquires the context information of the terminal;

the time when or after at least one target node acquires the context information of the terminal.

Optionally, the stop time of the preset timer includes at least one of the following:

the time when or after the terminal determines that the handover is successful or failed;

the time when or after the terminal determines that the connection re-establishment is successful or failed.

Optionally, the number of handover attempts reaches the first preset number, includes:

the number of handover attempts satisfying the handover condition reaches the first preset number.

Optionally, the processor 910 is further configured to perform at least one of the following:

initiating a connection re-establishment on the source node;

initiating a connection re-establishment on the target node;

initiating a connection re-establishment on at least one target node;

initiating a connection re-establishment on a node corresponding to the re-establishment condition which is satisfied by the terminal, wherein the node includes at least one of the source node or the target node in the handover process;

initiating a connection re-establishment on at least one node corresponding to the re-establishment condition which is satisfied by the terminal, wherein the at least one node includes at least one of the source node or the target node in the handover process;

initiating a connection re-establishment on each of at least two target nodes in the handover process successively until the connection re-establishment is successful, or the number of connection re-establishment attempts reaches a third preset number, or the preset timer expires.

Optionally, the processor 910 is further configured to initiate a connection re-establishment on at least one target node corresponding to the handover condition which is satisfied by the terminal.

The initiating a connection re-establishment on each of at least two target nodes in the handover process successively until the connection re-establishment is successful, or the number of connection re-establishment attempts reaches a third preset number, or the preset timer expires, includes:

initiating a connection re-establishment on each target node corresponding to the handover condition or connection re-establishment condition which is satisfied by the terminal successively, until the connection re-establishment is successful, or the number of connection re-establishment attempts reaches the third preset number, or the preset timer expires.

Optionally, the processor 910 is further configured to initiate a connection re-establishment on at least one target node corresponding to the handover condition which is configured in the handover command and satisfied by the terminal.

Optionally, the processor 910 is further configured to receive the re-establishment information sent by the target node or the source node, wherein the re-establishment information includes at least one of a re-establishment condition or a re-establishment configuration.

Optionally, the processor 910 is further configured to receive the re-establishment information sent by the source node, the re-establishment information is sent by the target node in a container to the source node.

Optionally, the processor 910 is further configured to receive the re-establishment information sent by the target node or the source node through a handover command or a mobility control command.

Optionally, the processor 910 is further configured to perform at least one of the following:

initiating a connection re-establishment on the first node by using the re-establishment configuration of the source node;

initiating a connection re-establishment on the first node by using the re-establishment configuration of the target node;

initiating a connection re-establishment on the first node by using the re-establishment configuration of the first node;

initiating a connection re-establishment on the first node by using the re-establishment configuration in the handover command;

initiating a connection re-establishment on the first node by using at least one of the re-establishment configuration in at least one of the handover command;

initiating a connection re-establishment on the first node by using the re-establishment configuration of a target node corresponding to the handover condition which is satisfied by the terminal, or by using the re-establishment configuration of at least one target node corresponding to the handover condition which is satisfied by the terminal;

initiating a connection re-establishment on the first node by using the re-establishment configuration of a target node corresponding to the re-establishment condition which is satisfied by the terminal, or by using the re-establishment configuration of at least one target node corresponding to the re-establishment condition which is satisfied by the terminal.

It will be appreciated that, in the embodiments of the present disclosure, the radio frequency (RF) unit 901 may be used to receive and sent information, or receive and send signals during a call. Specifically, after the downlink data from the base station is received, it is processed by the processor 910; in addition, the uplink data is sent to the base station. Generally, the radio frequency unit 901 includes but is not limited to an antenna, at least one amplifier, a transceiver, a coupler, a low noise amplifier, a duplexer, and the like. In addition, the radio frequency unit 901 can also communicate with the network and other devices through a wireless communication system.

The terminal provides users with wireless broadband Internet access through the network module 902, such as receiving and sending emails for users, browsing web pages, accessing streaming media, and the like.

The audio output unit 903 may convert audio data received by the radio frequency unit 901 or the network module 902 or stored in the storage 909 into audio signals and output as sound. Moreover, the audio output unit 903 may also provide audio output (e.g., call signal reception sound, message reception sound, etc.) related to a specific function performed by the terminal 900. The audio output unit 903 includes a speaker, a buzzer, a telephone receiver, and the like.

The input unit 904 is used to receive audio or video signals. The input unit 904 may include a graphics processing unit (GPU) 9041 and a microphone 9042, and the graphics processor 9041 may process image data of static pictures or videos obtained by an image capture device (such as a camera) in a video capture mode or an image capture mode. The processed image frames may be displayed on the display unit 906. The image frames processed by the graphics processor 9041 may be stored in the storage 909 (or other storage medium) or sent via the radio frequency unit 901 or the network module 902. The microphone 9042 can receive sound, and can process such sound into audio data. The processed audio data can be converted into a format that can be sent to the mobile communication base station via the radio frequency unit 901 in the case of the telephone call mode.

The terminal 900 also includes at least one sensor 905, such as a light sensor, a motion sensor, and other sensors. Specifically, the light sensor includes an ambient light sensor and a proximity sensor, where the ambient light sensor can adjust the brightness of the display panel 9061 according to the brightness of the ambient light, and the proximity sensor can turn off the display panel 9061 and/or backlight when the terminal 900 moves to the ear. As a type of motion sensor, an accelerometer sensor can detect the magnitude of acceleration in various directions (generally three axes), and can detect the magnitude and direction of gravity when at rest, and can be used for identifying of the posture of terminal (such as horizontal and vertical screen switching, related games, magnetometer attitude calibration), vibration recognition related functions (such as pedometer, tap), etc.; the sensor 905 may also include a fingerprint sensor, a pressure sensor, an iris sensor, a molecular sensor, a gyroscope, a barometer, a hygrometer, a thermometer, an infrared sensor, etc., which will not be repeated here.

The display unit 906 is used to display information input by the user or information provided to the user. The display unit 906 may include a display panel 9061, and the display panel 9061 may be configured in the form of liquid crystal display (LCD), organic light-emitting diode (OLED), or the like.

The user input unit 907 can be used to receive input numeric or character information, and generate key signal input related to user settings and function control of the terminal. Specifically, the user input unit 907 includes a touch panel 9071 and other input device(s) 9072. The touch panel 9071, also known as a touch screen, can collect user's touch operations on or near it (for example, operations by the user using any suitable object or accessory such as a finger or a stylus on or near the touch panel 907). The touch panel 9071 may include two parts of a touch detection device and a touch controller. Among them, the touch detection device detects the user's touch orientation and detects the signal brought by the touch operation, and transmits the signal to the touch controller; the touch controller receives touch information from the touch detection device, converts it into contact coordinates, and then send it to the processor 910, and receive the command sent by the processor 910 and execute it. In addition, the touch panel 9071 can be implemented in various types, such as resistive, capacitive, infrared, and surface acoustic wave types. In addition to the touch panel 9071, the user input unit 907 may also include other input device(s) 9072. Specifically, other input devices 9072 may include, but are not limited to, a physical keyboard, function keys (such as volume control keys, switch keys, etc.), a trackball, a mouse, and a joystick, which will not be repeated here.

Further, the touch panel 9071 may be overlaid on the display panel 9061. When the touch panel 9071 detects a touch operation on or near it, it transmit it to the processor 910 to determine the type of touch event, and then the processor 910 provides a corresponding visual output on the display panel 9061 according to the type of touch event. Although in FIG. 9, the touch panel 9071 and the display panel 9061 are implemented as two separate components to realize the input and output functions of the terminal, in some embodiments, the touch panel 9071 and the display panel 9061 may be integrated together to implement the input and output functions of the terminal, which is not specifically limited here.

The interface unit 908 is an interface for connecting an external device to the terminal 900. For example, the external device may include a wired or wireless headset port, an external power (or battery charger) port, a wired or wireless data port, a memory card port, a port for connecting a device with an identification module, an audio input/output (I/O) port, a video I/O port, a headphone port, etc. The interface unit 908 may be used to receive inputs from external devices (e.g., data information, power, etc.) and transmit the received inputs to one or more elements within the terminal 900 or may be used to transfer data between the terminal 900 and the external devices.

The storage 909 may be used to store software programs and various data. The storage 909 may mainly include a program storage area and a data storage area, where the program storage area may store an operating system, application programs required for at least one function (such as a sound playback function, an image playback function, etc.); the data storage area may store data created for the use of mobile phone (such as audio data, phone books, etc.), etc. In addition, the storage 909 may include a high-speed random access memory, and may also include a non-volatile memory, such as at least one magnetic disk storage device, a flash memory device, or other volatile solid-state storage devices.

The processor 910 is the control center of the terminal, and uses various interfaces and lines to connect various parts of the entire terminal. By running or performing software programs and/or modules stored in the storage 909, and calling data stored in the storage 909, it performs various functions and processing data of the terminal, so as to monitor the entire terminal. The processor 910 may include one or more processing units; optionally, the processor 910 may integrate an application processor and a modem processor, where the application processor mainly handles an operating system, a user interface, and application programs, etc., and the modem processor mainly handles wireless communication. It can be understood that, the foregoing modem processor may not be integrated into the processor 910.

The terminal 900 may further include a power supply 911 (such as a battery) that supplies power to the components. Optionally, the power supply 911 may be logically connected to the processor 910 through a power management system, thereby functions such as management of charging, discharging, and power consumption can be achieved through the power management system.

In addition, the terminal 900 includes some function modules not shown, which will not be detailed here.

Figure 10:
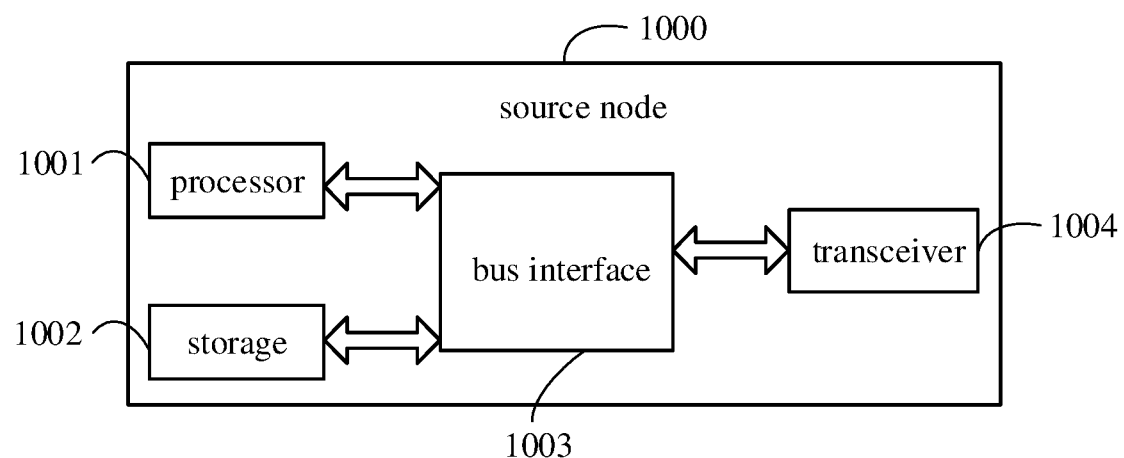
FIG. 10 is a structural diagram of a source node according to another embodiment of the present disclosure.

FIG. 10 is a structural diagram of a source node according to another embodiment of the present disclosure. As shown in FIG. 10, the source node 1000 includes, but is not limited to, a processor 1001, a storage 1002, a bus interface 1003 and a transceiver 1004, the processor 1001, the storage 1002 and the transceiver 1004 are connected with the bus interface 1003.

According to the embodiment of the present disclosure, the source node 1000 further include a computer program stored on the storage 1002 and capable of running on the processor 1001, the computer program implementing, when executed by the processor 1001, the following steps:

receiving re-establishment information sent by the target node, wherein the re-establishment information includes at least one of a re-establishment condition or a re-establishment configuration; and sending the re-establishment information to the terminal.

Optionally, the computer program implements the following steps when executed by the processor 1001:

receiving the re-establishment information which is sent by the target node and contained in a container.

Optionally, the computer program implements the following steps when executed by the processor 1001:

sending the re-establishment information contained in the container to the terminal.

Optionally, the computer program implements the following steps when executed by the processor 1001:

sending the re-establishment information to the terminal through the handover command or the mobility control command.

Optionally, the computer program implements the following steps when executed by the processor 1001:

sending context information of the terminal to the target node.

Optionally, the computer program implements the following steps when executed by the processor 1001:

sending the context information of the terminal to the target node after receiving a terminal context information request sent by the target node.

Figure 11:
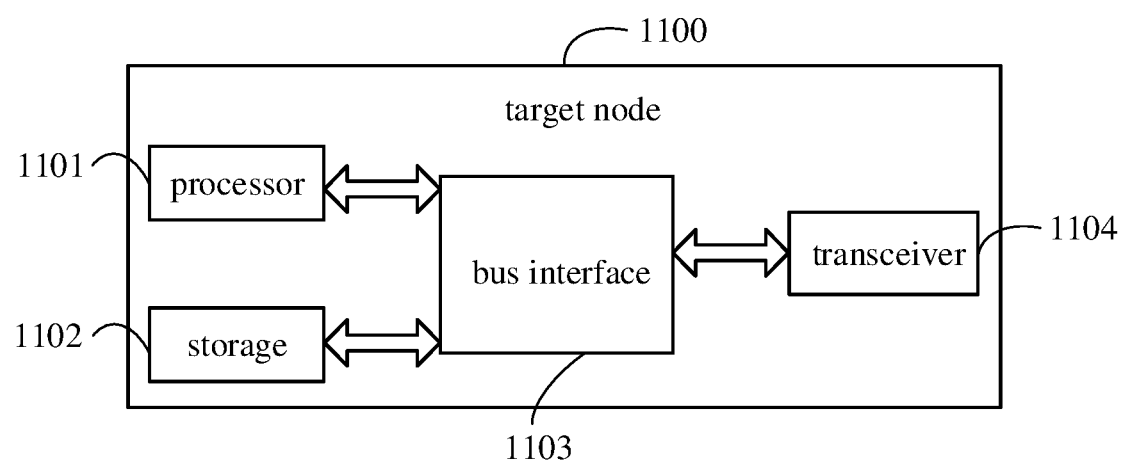
FIG. 11 is a structural diagram of a target node according to another embodiment of the present disclosure.

FIG. 11 is a structural diagram of a target node according to another embodiment of the present disclosure. As shown in FIG. 11, the target node 1100 includes, but is not limited to, a processor 1101, a storage 1102, a bus interface 1103 and a transceiver 1104, the processor 1101, the storage 1102 and the transceiver 1104 are connected with the bus interface 1103.

According to the embodiment of the present disclosure, the target node 1100 further include a computer program stored on the storage 1102 and capable of running on the processor 1101, the computer program implementing, when executed by the processor 1101, the following steps:

sending the re-establishment information to the source node or the terminal, wherein the re-establishment information includes at least one of a re-establishment condition or a re-establishment configuration.

Optionally, the computer program implements the following steps when executed by the processor 1101:

sending the re-establishment information contained in a container to the source node.

Optionally, the computer program implements the following steps when executed by the processor 1101:

sending the re-establishment configuration to the terminal through the handover command or the mobility control command.

Optionally, the computer program implements the following steps when executed by the processor 1101:

receiving context information of the terminal sent by the source node.

Optionally, the computer program implements the following steps when executed by the processor 1101:

sending a terminal context information request to the source node; and receiving the context information of the terminal sent by the source node.

Optionally, an embodiment of the present disclosure further provides a terminal including a processor, a storage, and a computer program stored on the storage and capable of running on the processor, the computer program implementing, when executed by the processor, the processes implemented by the terminal in the connection re-establishment method as mentioned above, and achieving the same technical effects. To avoid repetition, it will not be described here again.

Optionally, an embodiment of the present disclosure further provides a source node including a processor, a storage, and a computer program stored on the storage and capable of running on the processor, the computer program implementing, when executed by the processor, the processes implemented by the source node in the connection re-establishment method as mentioned above, and achieving the same technical effects. To avoid repetition, it will not be described here again.

Optionally, an embodiment of the present disclosure further provides a target node including a processor, a storage, and a computer program stored on the storage and capable of running on the processor, the computer program implementing, when executed by the processor, the processes implemented by the target node in the connection re-establishment method as mentioned above, and achieving the same technical effects. To avoid repetition, it will not be described here again.

An embodiment of the present disclosure further provides a computer readable storage medium having a computer program stored thereon, the computer program implementing, when executed by a processor, the processes of any of above connection re-establishment methods, and achieving the same technical effects. To avoid repetition, it will not be described here again. The computer readable storage medium may be, for example, a read-only memory (ROM), a random access memory (RAM), a magnetic disk, or an optical disk, etc.

It should be noted that, herein the terms "comprising", "including" or any other variant thereof are intended to cover non-exclusive inclusion, so that a process, method, article, or device that includes a series of elements includes not only those elements, but also those that are not explicitly listed, or further includes elements inherent to such process, method, article or device. Without more restrictions, the element defined by the sentence "comprising a . . . " does not exclude that there are other identical elements in the process, method, article, or device that includes the element.

With the description of the above embodiments, those skilled in the art can clearly understand that the methods in the above embodiments can be implemented by means of software plus a necessary general hardware platform, and of course, can also be implemented by hardware, but in many cases the former is a preferred implementation. Based on such an understanding, the essential technical solutions of the present disclosure, or part of the technical solutions that contributes to the related art, can be embodied in the form of a software product; the computer software product is stored in a storage medium (such as a ROM/RAM, a magnetic disk, or an optical disk), including several instructions used to cause a terminal (which may be a mobile phone, a computer, a server, an air conditioner, or a network device, etc.) to perform the methods described in various embodiments of the present disclosure.

The embodiments of the present disclosure have been described above with reference to the drawings, but the present disclosure is not limited to the above specific embodiments. The above specific embodiments are merely schematic, not restrictive. Under the inspiration of the present disclosure, many forms can be made by those skilled in the art without departing from the purpose of the present disclosure and the scope protected by the claims, all of which fall within the protective scope of the present disclosure.

What is claimed is:

1. A connection re-establishment method, applied to a terminal, the method comprising:

performing a handover process;

initiating a connection re-establishment on a first node if a re-establishment trigger condition is satisfied by the terminal, wherein the first node comprises target node in the handover process;
wherein the re-establishment trigger condition comprises at least one of the following:
handover failure, connection establishment failure, connection re-establishment failure, preset re-establishment conditions, and radio link failure RLF, wherein the handover failure comprises that the number of handover attempts reaches a first preset number.

2. The method according to claim 1, wherein
the handover failure further comprises at least one of the following:
   failure of handover from the source node to the target node;
   failure of handover from the source node to at least one target nodes;
   the number of times satisfying the handover condition reaches a second preset number and the handover fails;
the connection re-establishment failure comprises at least one of the following:
   failure of connection re-establishment initiated on the source node;
   failure of connection re-establishment initiated on the target node;
   failure of connection re-establishment initiated on at least one target node;
the RLF comprises:
   RLF that occurs when at least one handover condition is satisfied.

3. The method according to claim 2, wherein
the start time of the handover timer comprises at least one of the following:
   when or after the terminal determines that the handover condition in the handover command is satisfied;
   when or after the terminal determines that at least one handover condition in at least one handover command is satisfied;
   when or after the terminal receives the handover command;
the stop time of the handover timer comprises at least one of the following:
   the time when or after the terminal determines that the handover is successful or failed;
   the time when or after the terminal determines that the connection re-establishment is successful or failed;
the start time of the preset timer comprises at least one of the following:
   the time when or after the terminal determines that the conditions in the handover command are satisfied;
   the time when or after the terminal determines that at least one handover condition of at least one handover command is satisfied;
   the time when or after the terminal receives the handover command;
   the time when or after the target node acquires the context information of the terminal;
   the time when or after at least one target node acquires the context information of the terminal;
the stop time of the preset timer comprises at least one of the following:
   the time when or after the terminal determines that the handover is successful or failed;
   the time when or after the terminal determines that the connection re-establishment is successful or failed.

4. The method according to claim 2, wherein the number of handover attempts reaches the first preset number, comprises that the number of handover attempts satisfying the handover condition reaches the first preset number.

5. The method according to claim 1, wherein the initiating a connection re-establishment on the first node, comprises at least one of the following:
   initiating a connection re-establishment on the source node;
   initiating a connection re-establishment on the target node;
   initiating a connection re-establishment on at least one target node;
   initiating a connection re-establishment on a node corresponding to the re-establishment condition which is satisfied by the terminal, wherein the node comprises at least one of the source node or target node in the handover process;
   initiating a connection re-establishment on at least one node corresponding to the re-establishment condition which is satisfied by the terminal, wherein the at least one node comprises at least one of the source node or target node in the handover process;
   initiating a connection re-establishment on each of at least two target nodes in the handover process successively until the connection re-establishment is successful, or the number of connection re-establishment attempts reaches a third preset number, or the preset timer expires.

6. The method according to claim 5, wherein
the initiating the connection re-establishment on at least one target node, comprises:
   initiating a connection re-establishment on at least one target node corresponding to the handover condition which is satisfied by the terminal; and
the initiating a connection re-establishment on each of at least two target nodes in the handover process successively until the connection re-establishment is successful, or the number of connection re-establishment attempts reaches a third preset number, or the preset timer expires, comprises:
   initiating a connection re-establishment on each target node corresponding to the handover condition or connection re-establishment condition which is satisfied by the terminal successively, until the connection re-establishment is successful, or the number of connection re-establishment attempts reaches the third preset number, or the preset timer expires.

7. The method according to claim 6, wherein
the initiating a connection re-establishment on at least one target node corresponding to the handover condition which is satisfied by the terminal, comprises:
   initiating a connection re-establishment on at least one target node corresponding to the handover condition which is configured in the handover command and satisfied by the terminal.

8. The method according to claim 1, further comprising:
receiving re-establishment information sent by the target node or the source node, wherein the re-establishment information comprises at least one of a re-establishment condition or a re-establishment configuration.

9. The method according to claim 8, wherein the receiving the re-establishment information sent by the source node, comprises:
   receiving the re-establishment information sent by the source node, the re-establishment information is sent by the target node in a container to the source node.

10. The method according to claim 8, wherein the receiving the re-establishment information sent by the target node or the source node, comprises:
receiving the re-establishment information sent by the target node or the source node through a handover command or a mobility control command.

11. The method according to claim 8, wherein
the initiating a connection re-establishment on the first node comprises at least one of the following:
initiating a connection re-establishment on the first node by using the re-establishment configuration of the source node;
initiating a connection re-establishment on the first node by using the re-establishment configuration of the target node;
initiating a connection re-establishment on the first node by using the re-establishment configuration of the first node;
initiating a connection re-establishment on the first node by using the re-establishment configuration in the handover command;
initiating a connection re-establishment on the first node by using at least one of the re-establishment configuration in at least one of the handover command;
initiating a connection re-establishment on the first node by using the re-establishment configuration of a target node corresponding to the handover condition which is satisfied by the terminal, or by using the re-establishment configuration of at least one target node corresponding to the handover condition which is satisfied by the terminal;
initiating a connection re-establishment on the first node by using the re-establishment configuration of a target node corresponding to the re-establishment condition which is satisfied by the terminal, or by using the re-establishment configuration of at least one target node corresponding to the re-establishment condition which is satisfied by the terminal.

12. A terminal, comprising: a processor, a storage, and a computer program stored on the storage and capable of running on the processor, the computer program implementing, when executed by the processor, the following steps:
performing a handover process;
initiating a connection re-establishment on a first node if a re-establishment trigger condition is satisfied by the terminal,
wherein the first node comprises a target node in the handover process;
wherein the re-establishment trigger condition comprises at least one of the following:
handover failure, connection establishment failure, connection re-establishment failure, preset re-establishment conditions, and radio link failure RLF, wherein the handover failure comprises that the number of handover attempts reaches a first preset number.

13. The terminal according to claim 12, wherein
the handover failure further comprises at least one of the following:
failure of handover from the source node to the target node;
failure of handover from the source node to at least one target nodes;
the number of times satisfying the handover condition reaches a second preset number and the handover fails;
the connection re-establishment failure comprises at least one of the following:
failure of connection re-establishment initiated on the source node;
failure of connection re-establishment initiated on the target node;
failure of connection re-establishment initiated on at least one target node;
the RLF comprises:
RLF that occurs when at least one handover condition is satisfied.

14. The terminal according to claim 13, wherein
the start time of the handover timer comprises at least one of the following:
when or after the terminal determines that the handover condition in the handover command is satisfied;
when or after the terminal determines that at least one handover condition in at least one handover command is satisfied;
when or after the terminal receives the handover command;
the stop time of the handover timer comprises at least one of the following:
the time when or after the terminal determines that the handover is successful or failed;
the time when or after the terminal determines that the connection re-establishment is successful or failed;
the start time of the preset timer comprises at least one of the following:
the time when or after the terminal determines that the conditions in the handover command are satisfied;
the time when or after the terminal determines that at least one handover condition of at least one handover command is satisfied;
the time when or after the terminal receives the handover command;
the time when or after the target node acquires the context information of the terminal;
the time when or after at least one target node acquires the context information of the terminal;
the stop time of the preset timer comprises at least one of the following:
the time when or after the terminal determines that the handover is successful or failed;
the time when or after the terminal determines that the connection re-establishment is successful or failed.

15. A target node, comprising: a processor, a storage, and a computer program stored on the storage and capable of running on the processor, the computer program implementing, when executed by the processor, the following steps:
sending the re-establishment information to the terminal according to claim 12, wherein the re-establishment information comprises at least one of a re-establishment condition or a re-establishment configuration.

16. The target node according to claim 15, wherein
the sending the re-establishment information to the source node comprises:
sending the re-establishment information contained in a container to the source node;
the sending the re-establishment information to the terminal comprises:
sending the re-establishment configuration to the terminal through the handover command or the mobility control command.

17. The target node according to claim 15, the computer program further implement the step of:
receiving context information of the terminal sent by the source node.

18. The target node according to claim 17, wherein the receiving context information of the terminal sent by the source node comprises:
- sending a terminal context information request to the source node; and
- receiving the context information of the terminal sent by the source node.

\* \* \* \* \*